US005631747A

United States Patent [19]
Farrell et al.

[11] Patent Number: 5,631,747
[45] Date of Patent: May 20, 1997

[54] APPARATUS AND METHOD FOR APPLYING TRIM MARKS TO A PRINT MEDIA SHEET

[75] Inventors: Michael E. Farrell, Ontario; Louis O. Pepin, Pittsford, both of N.Y.

[73] Assignee: Xerox Corporation, Stamford, Conn.

[21] Appl. No.: 517,326

[22] Filed: Aug. 21, 1995

[51] Int. Cl.⁶ .................................................. H04N 1/40
[52] U.S. Cl. ........................ 358/448; 358/449; 358/401
[58] Field of Search ................................. 358/448, 449, 358/450, 451, 452, 453, 401, 296, 537, 444; 382/100; 355/311; 395/117

[56] References Cited

U.S. PATENT DOCUMENTS 5,001,574  3/1991  Shimizu et al. ........................ 358/449
5,146,343  9/1992  Fujii ....................................... 358/449
5,223,939  6/1993  Imaizumi et al. ..................... 358/449
5,231,516  7/1993  Kamon et al. ........................ 358/449
5,398,289  3/1995  Rourke et al. ........................ 382/100

Primary Examiner—Edward L. Coles, Sr.
Assistant Examiner—Fan Lee
Attorney, Agent, or Firm—Gary B. Cohen

[57] ABSTRACT

A printing system with input and control systems is provided. The control system, which links the input system with a print engine, causes image data, representative of an image, and trim marks to be superposed, in a selected manner, on an electronic page. The electronic page, with its attendant trim marks, is stored in a memory for reproduction thereof by the print engine.

9 Claims, 11 Drawing Sheets

FIG. 6

APPARATUS AND METHOD FOR APPLYING TRIM MARKS TO A PRINT MEDIA SHEET

The present invention relates generally to a technique for producing one or more special prints and, more particularly, to a printing system in which a set of trim marks is applied to one or more electronic pages of a job so that the one or more special prints, including the trim mark set(s), can be produced with the electronic pages to enable a finishing operation to be performed with the trim marks.

Electronic printing systems typically include an input section, often referred to as an input image terminal ("IIT"), a controller, often referred to as an electronic subsystem ("ESS") and an output section or print engine, often referred to as an image output terminal ("IOT"). In one type of electronic printing system, manufactured by Xerox® Corporation, known as the DocuTech® electronic printing system, a job can be inputted to the IIT from, among other sources, a network or a scanner. An example of an IIT with both network and scanner inputs is found in the following patent, the pertinent portions of which are incorporated herein by reference:

U.S. Pat. No. 5,170,340

Patentees: Prokop et al.

Issued: Dec. 8, 1992

Electronic printing systems of the type described immediately above are increasingly being used by the commercial printing industry for use in applications that have heretofore been limited to offset printing equipment. One of these applications includes an operation referred to as "post-printing trimming" in which portions of output are cut off or trimmed. A post-printing trimming operation may be desirable to a customer for a variety of reasons:

A final sheet dimension may be nonstandard and the customer may desire that a standard stock size be employed;

A required image-to-sheet registration tolerance may be very small and the customer may wish to trim sheets for achieving the required registration (an example of when such small tolerance is crucial occurs when the customer desires that "trim bleed" be used to apply toner right up to the edge of a sheet); or The final sheet dimension may be smaller than a print engine's minimum supported stock size and the customer wishes to use a supported stock size and trim off the excess after printing.

Trim marks can also be used by customers to facilitate the obtaining of cut sheets from N-up output. In particular, it may be desirable to run a multiple up application and then cut or slit the printed sheet into individual documents.

The concept of providing trim lines to designate a location at which a print media sheet is to be trimmed is disclosed in now allowed U.S. patent application Ser. No. 08/169,573 entitled "Method of Setting-up a Finishing Device", filed by Farrell et al. on Dec. 20, 1993. More particularly, in one exemplary operational mode of the '573 application, a user interface, with a display, and an suitable processor are used to set up a representation of a test print with, among other indicators, a set of trim lines. The test print is then printed and trimmed with a trimmer to determine if the trimmer is appropriately set.

The concept of using a printing machine to produce a trimmable product is also addressed in U.S. Pat. No. 5,140,348 to Jamzadeh et al. (Issued: Aug. 18, 1992). Referring to FIGS. 1 and 3 of the '348 patent, multiple images are printed on a single sheet with an electronic printing machine. In particular, FIG. 3 illustrates the positioning of four 5×7 images on a 12×18 receiving sheet with borders. If the receiving sheet is cut along the dotted lines shown in the FIG. 3, a half inch border is provided for each print.

Other patents directed toward use of trim marks in the fields of printing and/or photography include U.S. Pat. No. 4,231,659 to Logan (Issued: Nov. 4, 1980) (disclosing a method of making overlay masks for photoetching of printing plates) and U.S. Pat. No. 3,844,253 to Staub (Issued: Oct. 29, 1974) (disclosing a photographic print marker for placing index marks on a strip of photographic paper for use by an automatic trimmer).

Pertinent portions of the above-discussed references are incorporated herein by reference.

The '348 patent to Jamzadeh et al. indicates the desirability of cutting along a given line of a print but it does not suggest that the line should be actually imaged on the print. Apparently, the '348 patent assumes that a user knows where cuts should be made and/or that the precision/accuracy of the cut or trim is not crucial. Precision/accuracy of the trim, however, can be critical in the area of commercial printing. Moreover, while the technique of the '573 application to Farrell et al. is well intended for its intended purpose, primarily to set up a finishing device, it does not contemplate a technique for creating trim marks to be used in a commercial printing process. It would be desirable to provide an inexpensive electronic reprographic based technique in which an electronic page with trim marks is provided for use in trimming operations requiring a relatively high degree of precision and accuracy.

In accordance with the present invention, there is provided a system for applying trim marks to the electronic page, the system being adapted for use with a printing system having an input system and a print engine. Preferably, a job is provided to the printing system by way of the input system, the job including an image with the image being represented by image data and having a first set of dimensions. The image data of the image is associated with an electronic page having both a second set of dimensions and peripheral edges, the image being printed on a substrate corresponding with the second set of dimensions, the first set of dimensions being smaller, in magnitude, than the second set of dimensions. The system comprises: a) a control system for linking the input system with the print engine, the control system, i) superposing the image data of the image on the electronic page so that the image is spaced from at least one of the peripheral edges, and ii) shifting the image, when a selected condition exists, so that the image is spaced from each one of the peripheral edges of the electronic page, and iii) applying trim marks to the electronic page, the trim marks being positioned in two or more spaced portions between the peripheral edges and the image; and b) a memory for storing a print ready representation, the print ready representation including the image superposed with the electronic page and the trim marks applied to the electronic page in the two or more spaced portions.

These and other aspects of the invention will become apparent from the following description, the description being used to illustrate a preferred embodiment of the invention when read in conjunction with the accompanying drawings.

Figure 1:
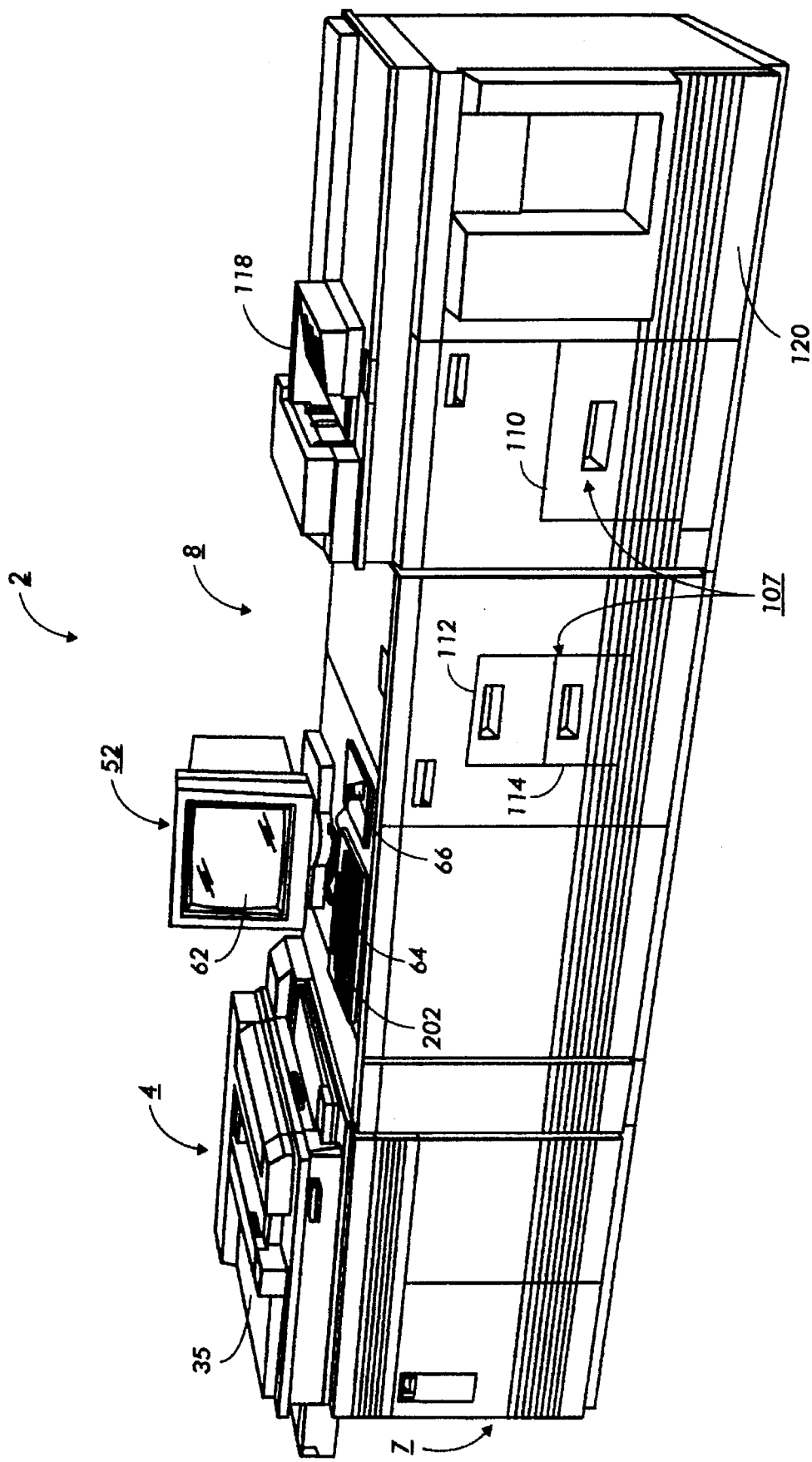
FIG. 1 is a view depicting an electronic printing system of the type adapted to execute the trim mark application technique of the present invention.
Figure 3:
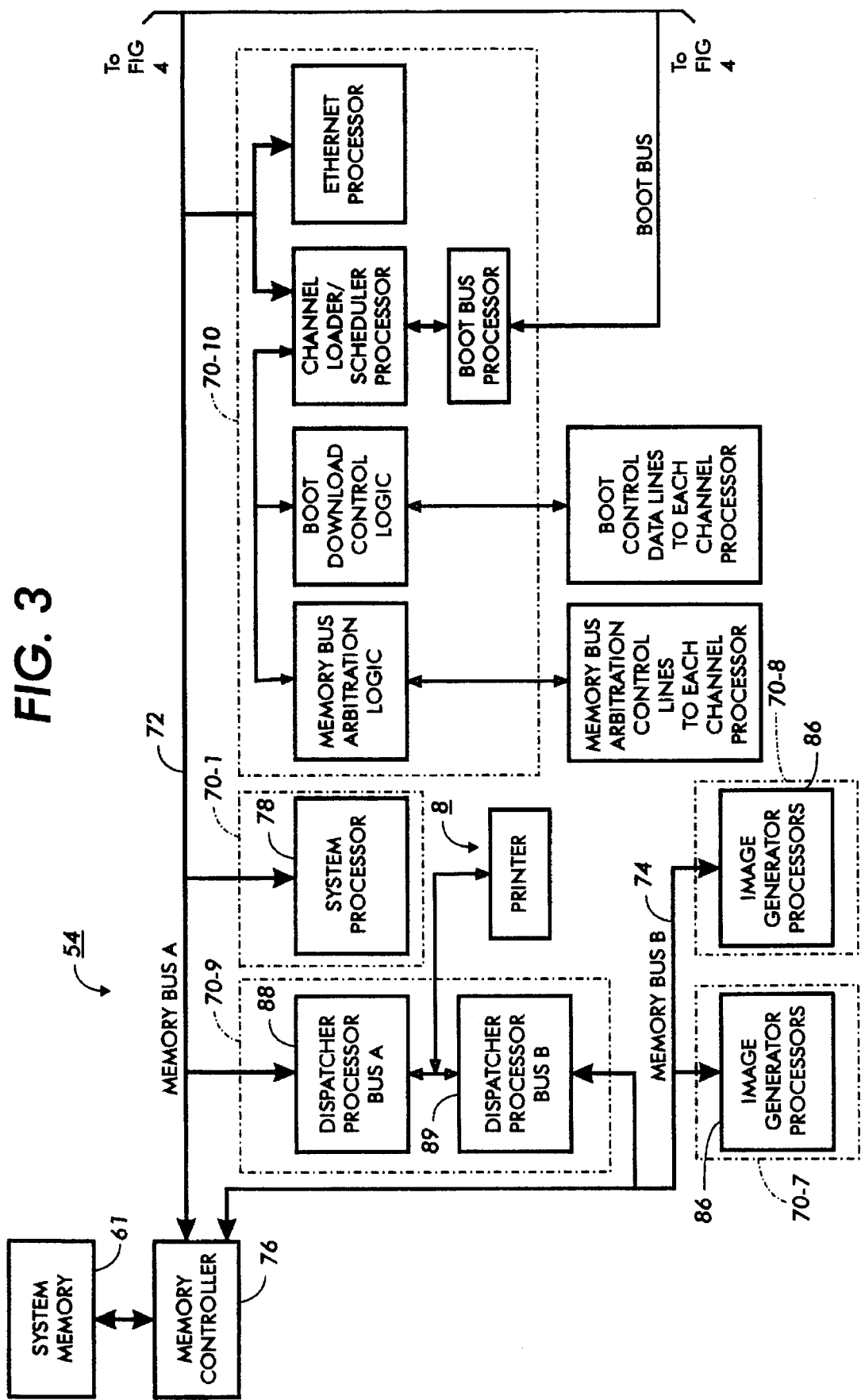
Figure 4:
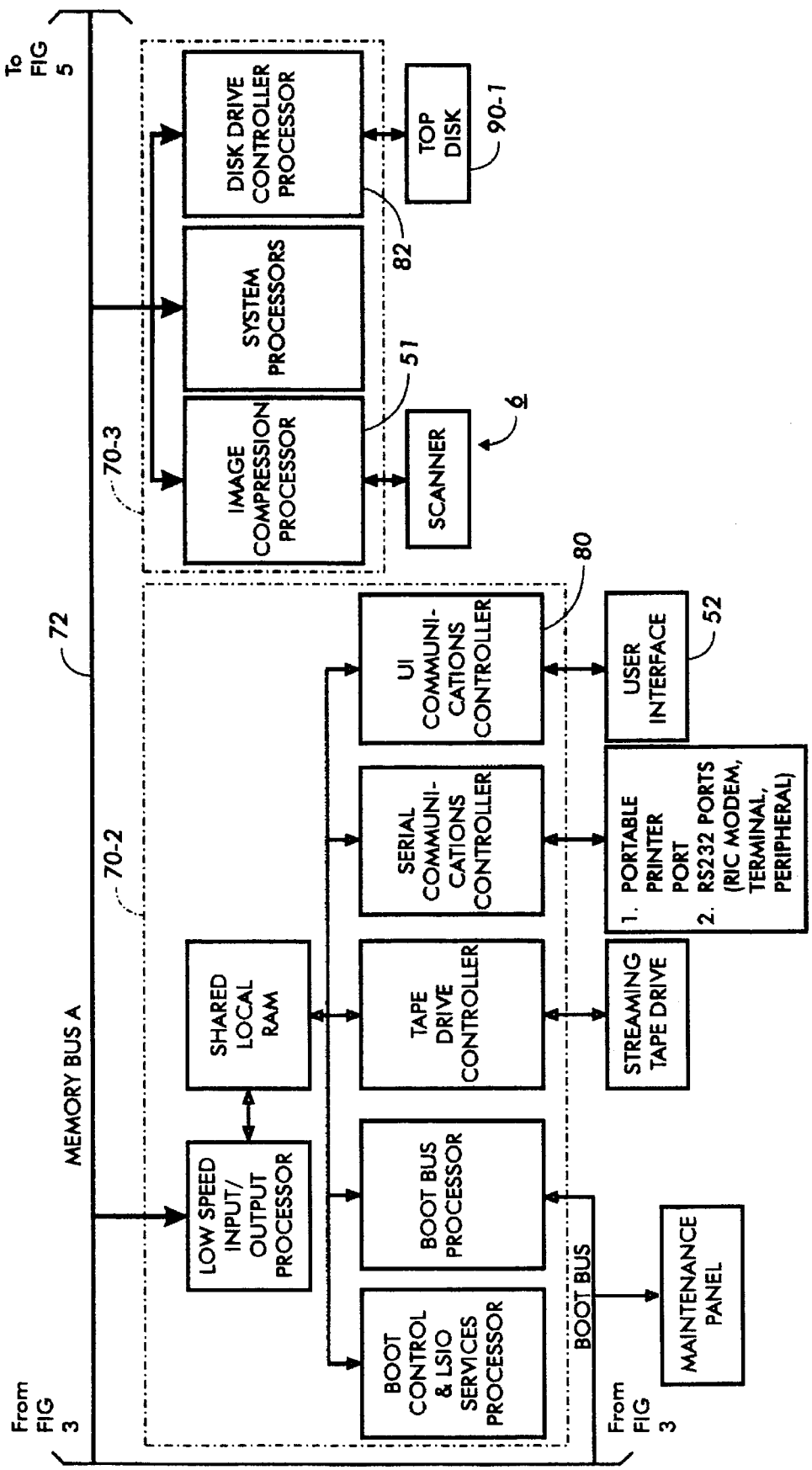
Figure 5:
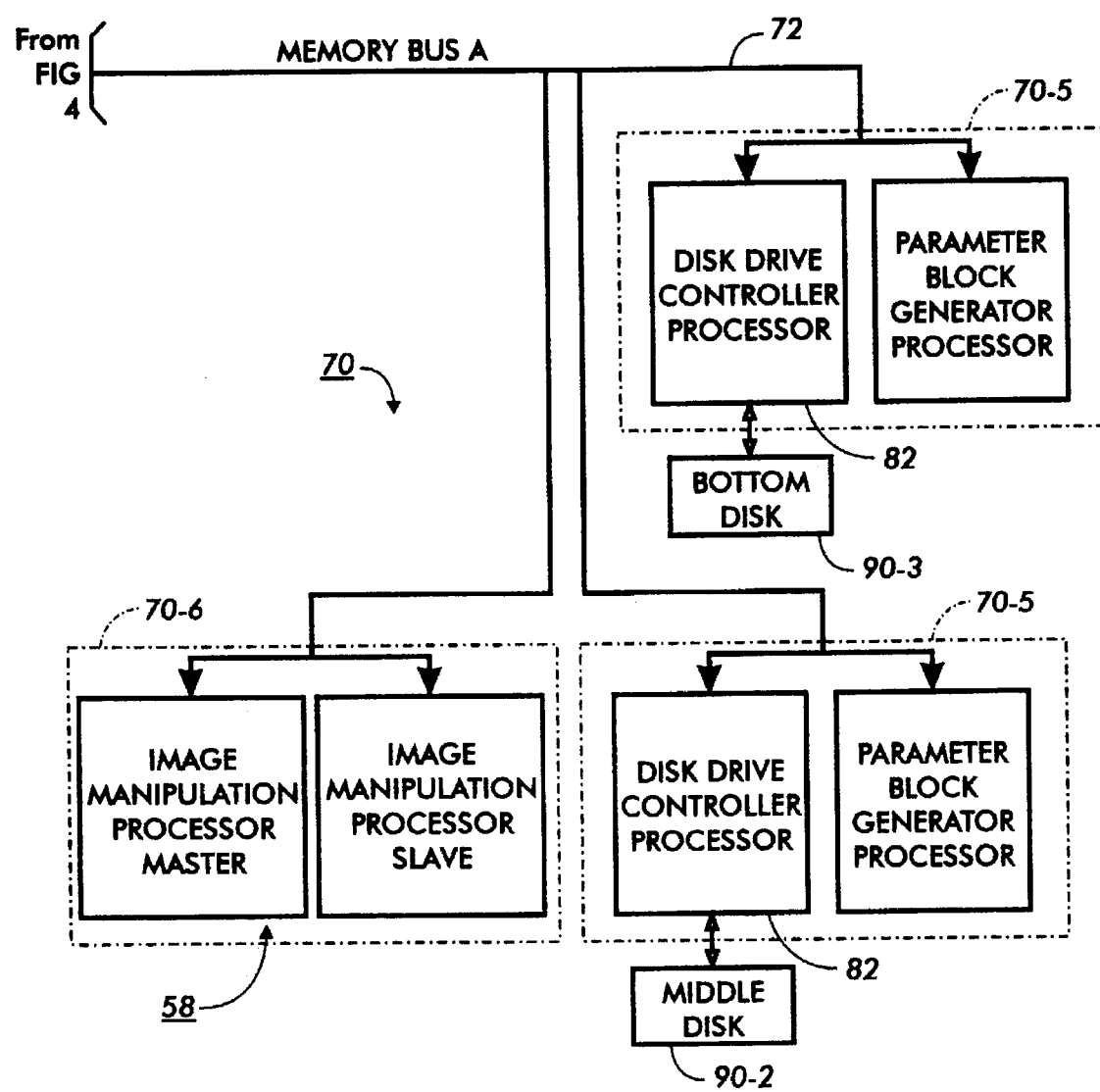
Figure 7:
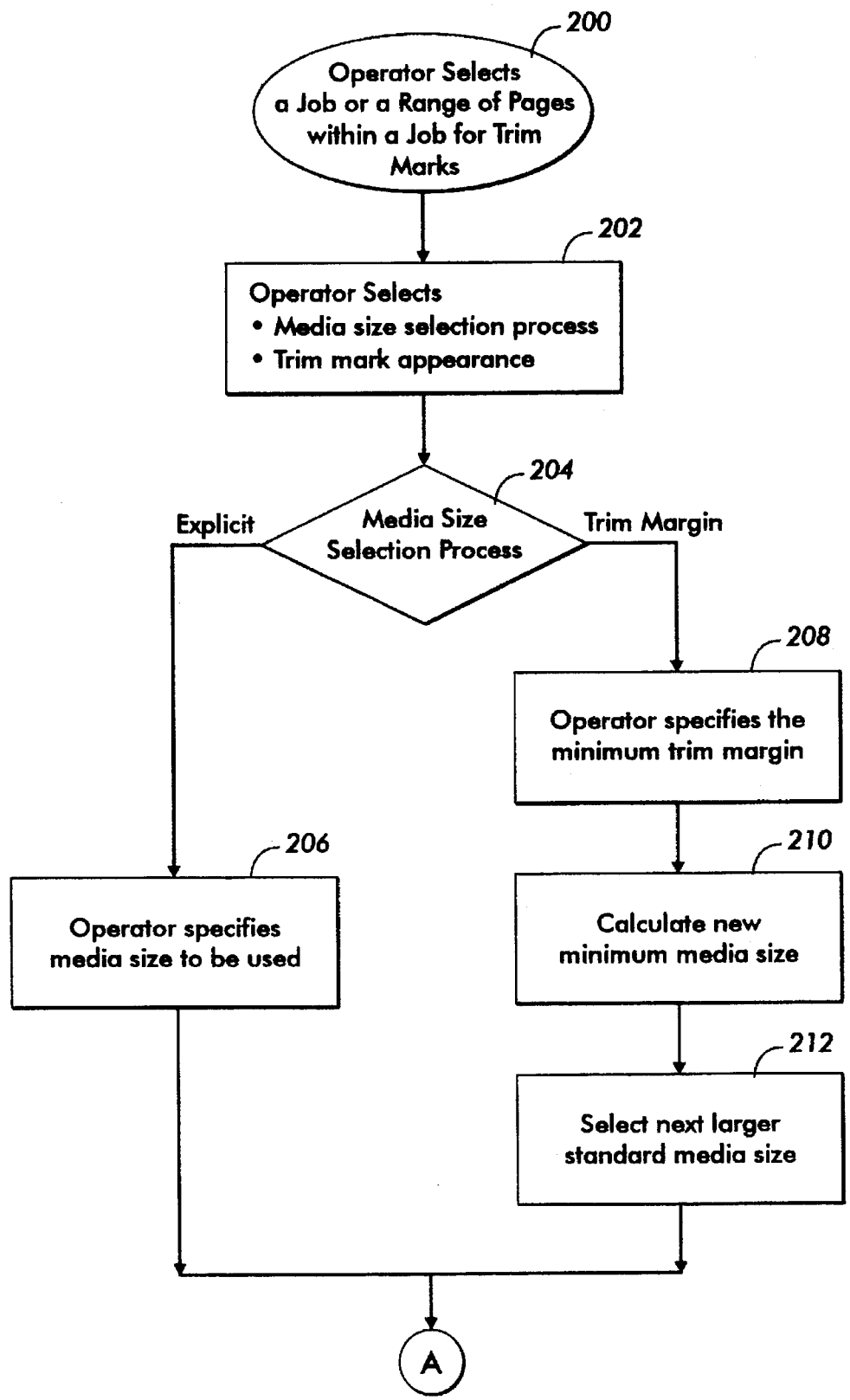
Figure 8:
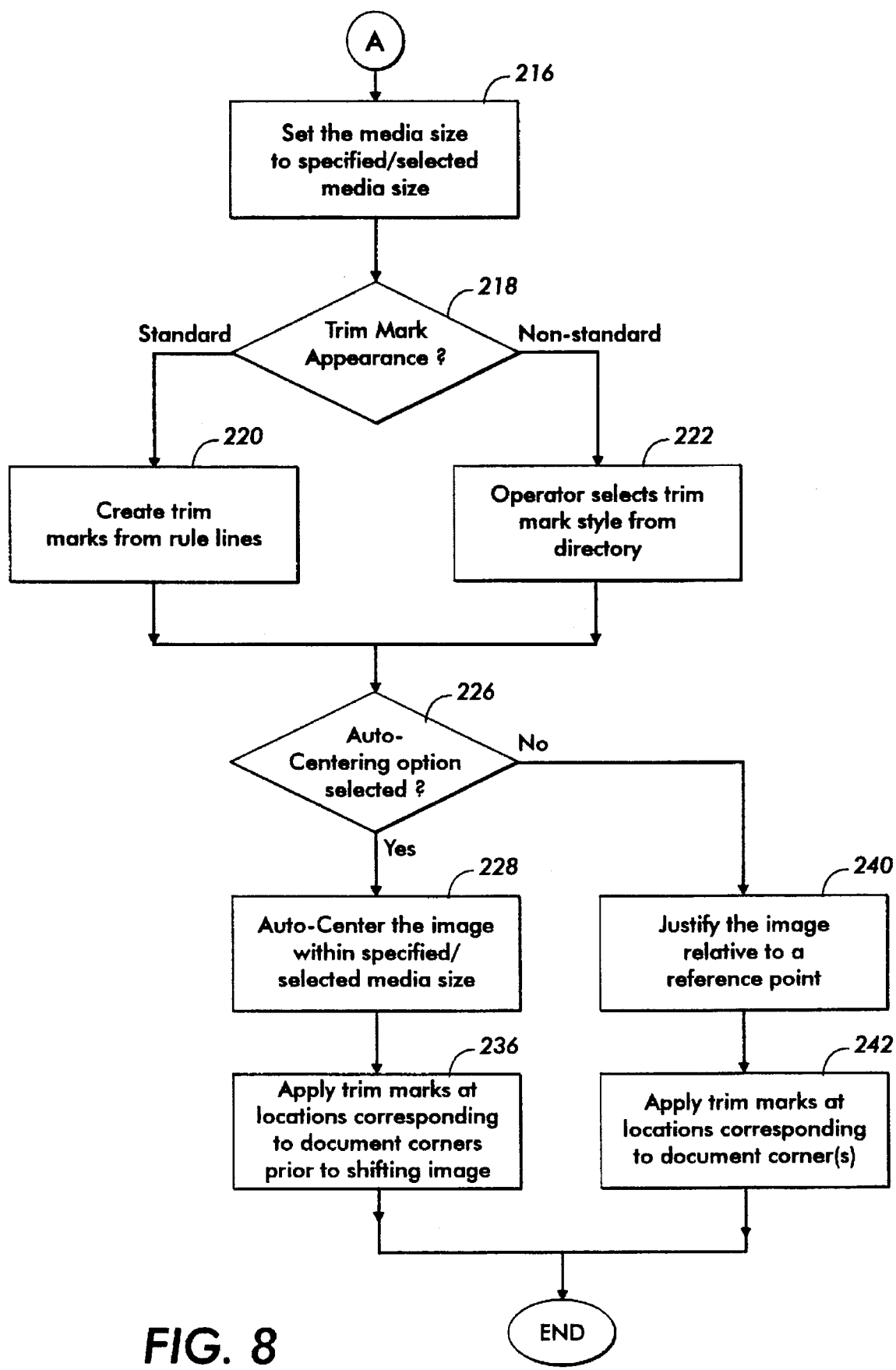
Figure 9:
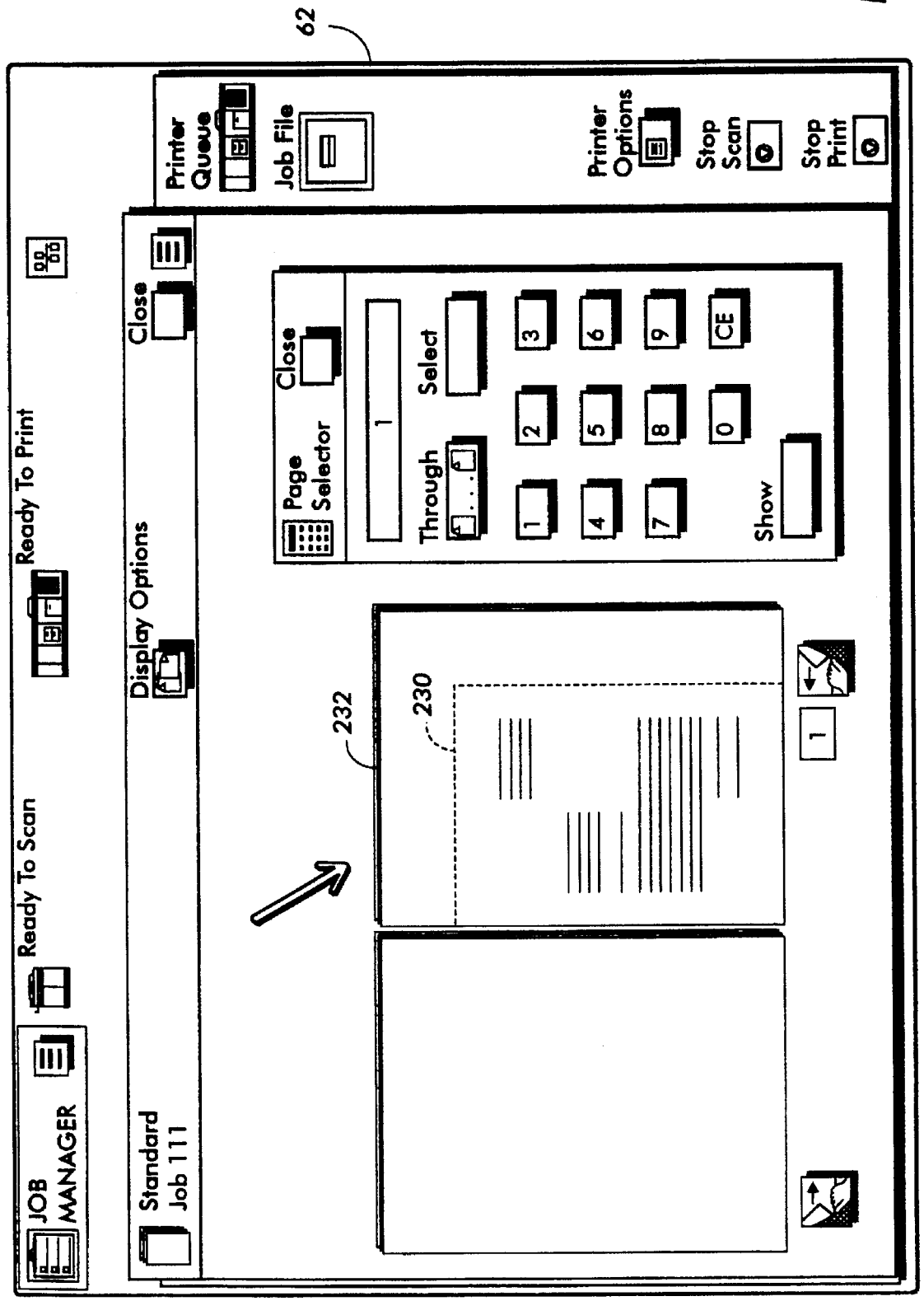
Figure 11:
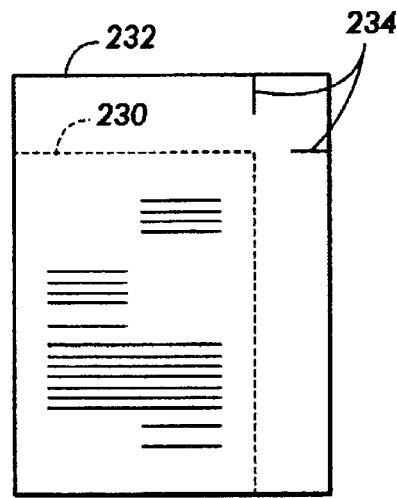

FIGS. 3–5 comprise a schematic block diagram showing the major parts of the control section for the printing system shown in FIG. 1;

Figure 6:
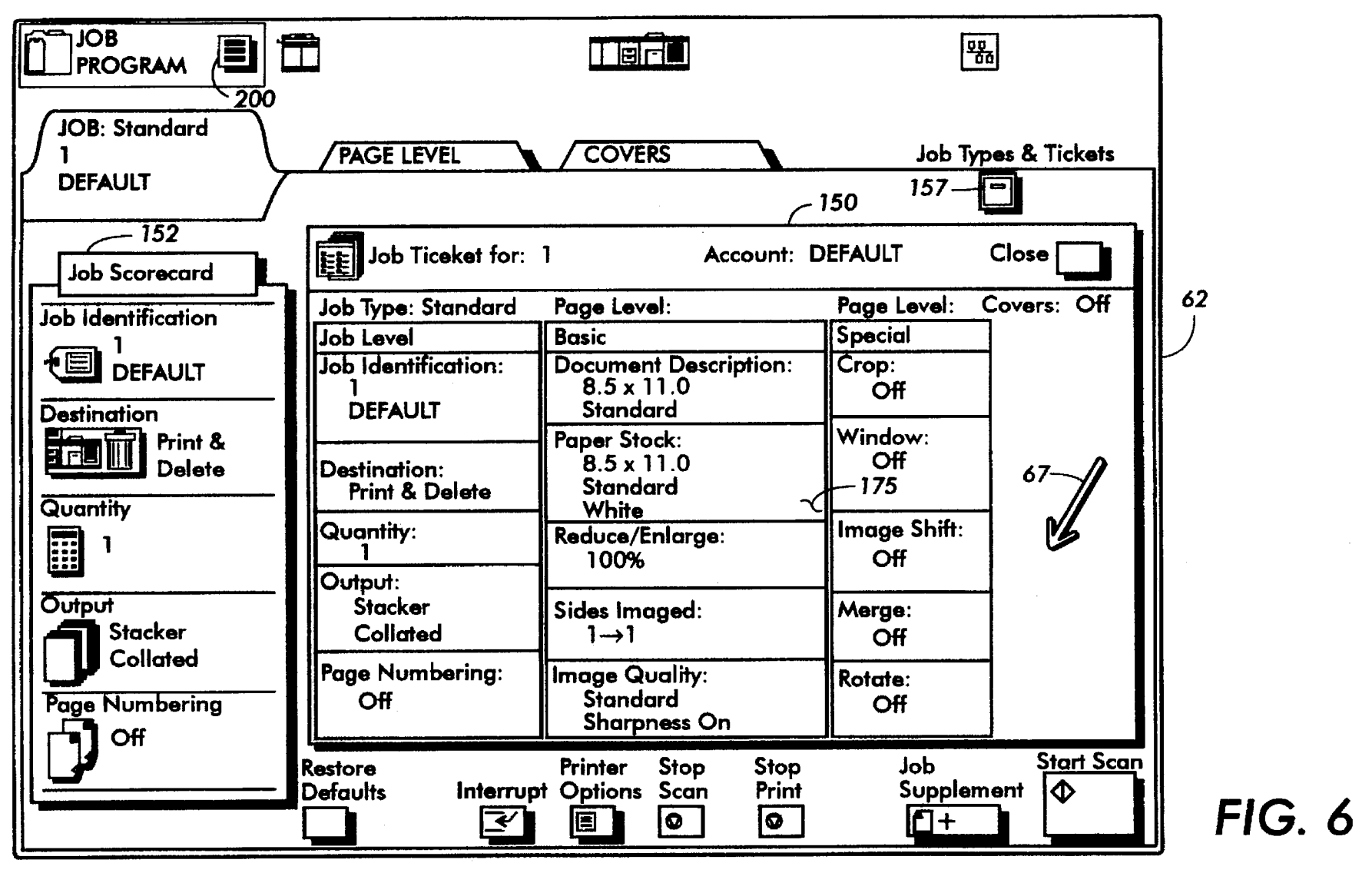

FIG. 6 is a view depicting an exemplary job programming ticket and job scorecard displayed on the User Interface (UI) touchscreen of the printing system shown in FIG. 1, the job ticket and job scorecard being associated with a job to be printed;

FIGS. 7 and 8 comprise a flow diagram depicting the various steps employed to apply trim marks on one or more electronic pages;

FIG. 9 is an elevational view of a dialog, shown on a UI display, suitable for use in implementing the procedure of the flow diagram of FIGS. 7 and 8;

FIGS. 10A–10D are partial, elevational views of dialog displays depicting the various stages of the trim mark application of the present invention;

FIG. 11 is a partial, elevational view of a dialog display demonstrating an alternative approach in the trim mark application; and FIGS. 12A–12D are partial, elevational views of page corners in which trim marks of varying design types have been applied.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 2:
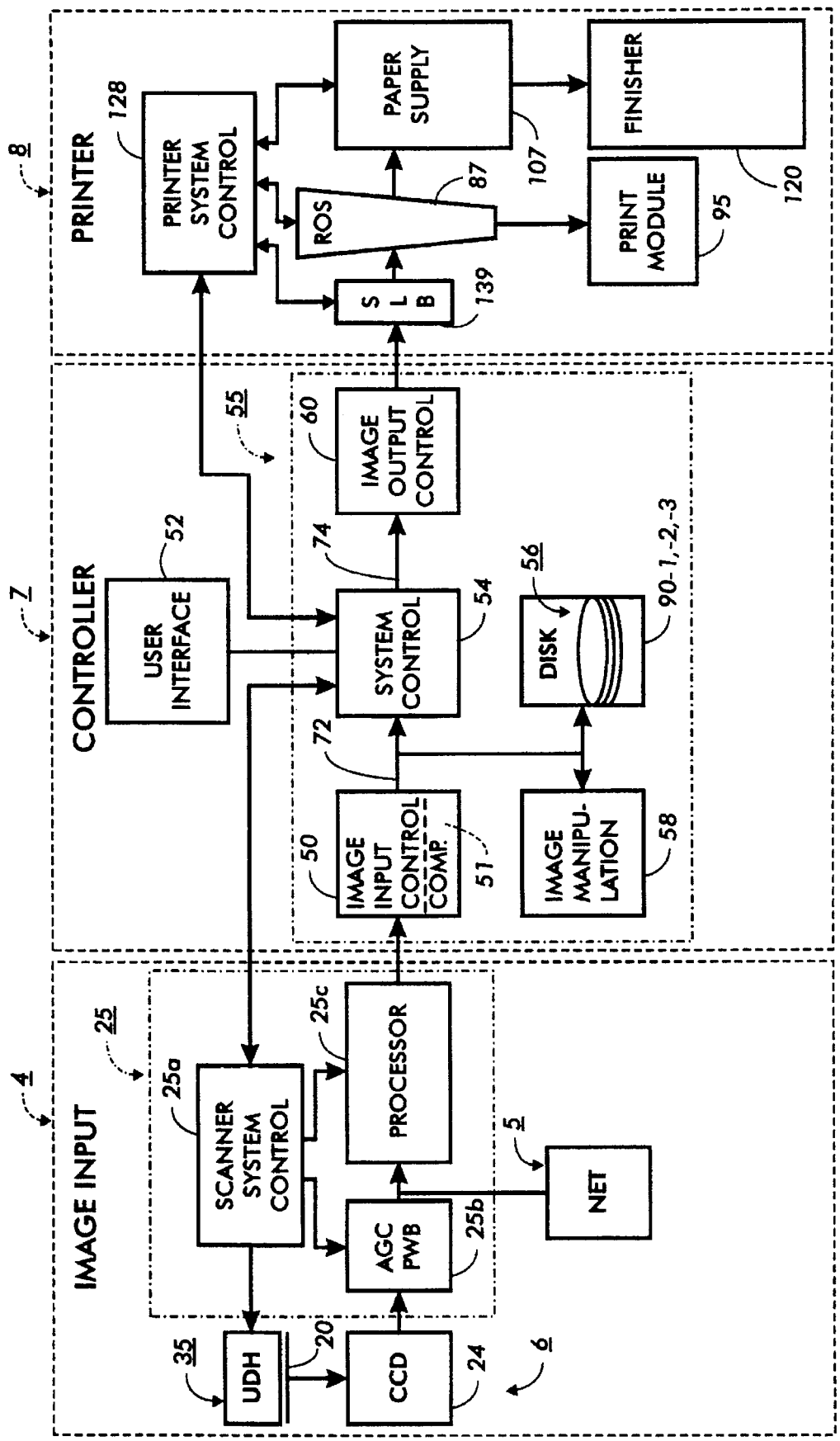
FIG. 2 is a block diagram depicting the major elements of the printing system shown in FIG. 1.

Referring to the drawings where like reference numerals designate identical or corresponding parts throughout the several views, and more particularly to FIGS. 1 and 2, there is shown an exemplary image printing system 2 for processing print jobs in accordance with the teachings of the present invention. Printing system 2, for purposes of explanation, is divided into image input section 4, controller section 7, and printer section 8. In the example shown, the image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc.

While a specific printing system is shown and described, the present invention may be used with other types of printing systems. For example, printer section 8 may instead use a different printer type such as ink jet, ionographic, thermal, photographic, etc., and, furthermore, may be incorporated in electronic display systems, such as CRTs, LCDs, LEDs, etc. or else other image scanning/processing/recording systems, or else other signal transmitting/receiving, recording systems, etc. as well.

For off-site image input, image input section 4 has a network 5 with a suitable communication channel such as an EtherNet® connection enabling image data in the form of image signals or pixels from one or more remote sources to be input to system 2 for processing. Where the Page Description Language (PDL) of the incoming imaging data is different than the PDL used by system 2, suitable conversion means (not shown) are provided. Other remote sources of image data such as streaming tape, floppy disk, video camera, etc. may be envisioned.

For on-site image input, section 4 has a document scanner section 6 with a Universal Document Handler (UDH) 35 for the purpose of automatically and sequentially placing and locating sets of multiple documents for scanning. Scanner section 6 incorporates one or more linear light sensitive arrays 24 for reciprocating scanning movement below platen 20 and focused on a line-like segment of platen 20 and the document being scanned thereon. Array 24, which may utilize Charge-Coupled Device (CCD) technology or the like, provides image elemental signals or pixels representative of the image scanned which are input to processor 25 for processing.

Processor 25 communicates with the controller section 7 and includes a scanner system control 25a, an automatic gain control printing wiring board (AGCPWB) 25b, and a processor 25c. AGCPWB 25b converts the analog image signals output by array 24 to digitally represented facsimile signals and processor 25c processes the digital image signals as required to enable controller section 7 to store and handle the image in the form and order required to carry out the job programmed. After processing, the image signals are output to controller section 7. Image signals derived from net 5 are similarly input to processor 25c.

Processor 25c also provides enhancements and changes to the image signals such as filtering, thresholding, screening, cropping, scaling (reduction/enlargement), etc. Following any changes and adjustments in the job program which affect these image processing parameters, the document must be rescanned to capture the specified modification.

Printer section 8 comprises a laser type printer having a Raster Output Scanner (ROS) 87, Print Module 95, Paper Supply 107, Finisher 120, and Printer System Control 128. ROS 87 has a two beam laser with the beams modulated in accordance with the content of an image signal input by acousto-optic modulator to provide dual imaging beams which are scanned across a moving photoreceptor of Print Module 95 by means of a rotating polygon. This exposes two image lines on the photoreceptor with each scan to create the latent electrostatic images represented by the image signal input to the modulator.

The latent electrostatic images are developed and transferred to a print media delivered by paper supply 107. As will be appreciated by those skilled in the art, print media can comprise a selected one of various known substrates which are capable of accepting an image, such substrates including transparencies, preprinted sheets, vellum, glossy covered stock, film or the like. The print media may comprise any of a variety of sheet sizes, types, and colors, and for this, plural media supply trays 110, 112, 114 (FIG. 1) are provided. The transferred image is permanently fixed or fused and the resulting prints discharged to either output tray 118 (FIG. 1), or to finisher 120. Finisher 120 provides certain finishing selections such as a stitcher for stitching or stapling the prints together to form books, a thermal binder for adhesively binding the prints into books, and/or other finishing options such as slitting, perforating, saddle stitching, folding, trimming, or the like.

Printer system control 128 (FIG. 2) automatically and precisely controls all the printer functions and operations in accordance with job program parameters received from system control 54 of controller section 7, as well as from internally derived signals from sensors and processes within the printer section 8. Printer system control signals are derived and distributed via a plurality of printed wiring boards (PWBs) in a multiprocessor architecture characterized by multiple microprocessor controller cores, serially interconnected, and also serially linked to more numerous input/output processing circuit PWBs. Controller section 7 is, for explanation purposes, divided into an image input control 50, User Interface (UI) 52, system control 54, main memory 56, image manipulation section 58, and image output control 60. The units 50, 54, 56, 58, 60 comprise a system which may also generally be referred to as the "Electronic Subsystem" (ESS).

The scanned image data input from processor 25c of scanner section 6 to controller section 7 is compressed by image compressor/processor 51 of image input control 50 and placed in an image file. Image files, which represent different print jobs, are temporarily stored in system memory 61 (seen in FIG. 3A) pending transfer to main memory 56 where the data is held pending use.

Referring again to FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, and to obtain system operating information, visual document facsimile display, programming information and icons, diagnostic information and pictorial views, etc. Items displayed on touchscreen 62 such as files and icons are actuated by either touching the displayed item on screen 62 with a finger, or by using mouse 66 to point cursor 67 (seen in FIG. 6) to the item selected and keying the mouse.

Main memory 56 (FIG. 2) has plural hard disks 90-1, 90-2, 90-3 for storing machine Operating System software, machine operating data, and the scanned image data currently being processed. When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 where the additional processing steps such as collation, make ready (document editing), decomposition, rotation, etc., are carried out. Following processing, the data may be returned to main memory 56, sent to UI 52 for display on touchscreen 62, or sent to image output control 60.

Referring particularly to FIGS. 3A-3C, image data output to image output control 60 is decompressed and readied for printing by image generating processors 86 of PWBs 70-7, 70-8. Following this, the data is output by dispatch processors 88, 89 on PWB 70-9 via Scan Line Buffer (SLB) 139 (FIG. 2) to printer section 8. Image data sent to printer section 8 for printing is normally purged from memory 56 to make room for new image data.

Control section 7 includes a plurality of Printed Wiring Boards (PWBs) 70 (FIGS. 3-5), PWBs 70 being coupled with one another and with System Memory 61 by a pair of memory buses 72, 74. A memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processor 82 for transmitting data to and from disks 90-1, 90-2, 90-3 respectively of main memory 56 image compressor/processor 51 for compressing the image data is on PWB 70-3); image manipulation PWB 706 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring to FIG. 6, jobs are programmed in a Job Program mode in which there is displayed on touchscreen 62 a Job Ticket 150 and a Job Scorecard 152 for the job being programmed. Job Ticket 150 displays various job selections available for programming, while Job Scorecard 152 displays the basic instructions to the system for printing the job. Various Job Ticket types are provided, with access by means of Job Types and Tickets icon 157.

Job Tickets 150 have three programming levels, referred to as "Job Level", "Basic", and "Special", each having a series of icons for accessing the various programming selections available at that level. Each programming level has a Scorecard 152 associated with it so that on activation of a particular job level or of a specific icon, the appropriate Scorecard is displayed on touchscreen 62.

As described, print jobs may be derived from multiple sources, i.e., jobs scanned in using scanner 6 for printing; jobs scanned in, stored, and then edited or added to for printing later; jobs remotely scanned in and submitted to the system as, for example, through net 5 (FIG. 2); jobs remotely developed and then submitted to the system for printing, etc.

Referring to FIGS. 7-12, a technique for applying trim marks to a print is described in detail. Referring specifically to FIG. 7, the trim application technique is initiated at step 200 where an operator of the printing system selects a job from a suitable location in memory 90. As illustrated in U.S. Pat. No. 5,164,842 to Gauronski et al., the pertinent portions of which are incorporated herein by reference, jobs for selection can be chosen from a job file which essentially serves as a "window" into the memory 90. In selecting the job, the user may specify a range of pages to be operated on with the present technique. Selection can be made with a selection system of the type shown in the '842 patent. A selection system suitable for use in the present technique is shown in FIG. 9. For ease of discussion, the present description only describes the application of trim marks to a single electronic page ("subject electronic page"). As will be understood by those skilled in the art, however, the present technique is suitable for applying trim marks onto multiple pages of a job.

At step 202, first and second routines, stored in memory, are provided in order to 1) implement a media size selection process, and 2) provide selected or default trim mark appearance, respectively. In the illustrated embodiment of FIG. 7, the media size selection routine (i.e. the first routine) is initiated at step 204. Depending on user input, the step 204 directs the system to receive input in a manual mode (step 206) or generate media size input based on information obtained from the user (steps 208, 210 and 212). More particularly, the user may set media size (step 206) with a suitable dialog, such as the dialog shown in FIG. 14 of U.S. Pat. No. 5,271,065 to Rourke et al., the pertinent portions of which are incorporated herein by reference or enter a minimum trim margin with a dialog similar to that shown in FIG. 16 of the same patent.

The trim margin is either set explicitly, by way of the path including step 206, or implicitly by calculating a minimum media size at step 210. In one example, the calculation of step 210 is achieved with information including media size for the job and minimum trim margins (set in step 208). Alternatively, the calculation is performed with data for actual image size, which data is determined through, for example, a known prescanning technique. To obtain the selected media size in step 212, the dimensions calculated in step 210 are rounded up to a media size available at the printing system. As is conventional, the available media sizes can be stored in memory and conventional comparison techniques can be employed to achieve the rounding up.

Figure 12A:
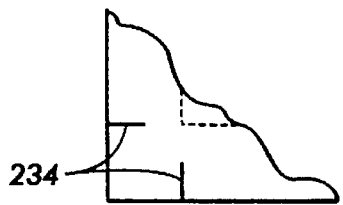
Figure 12B:
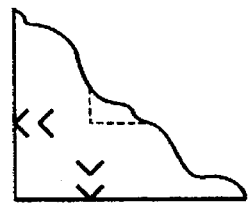
Figure 12C:
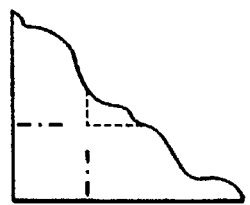
Figure 12D:
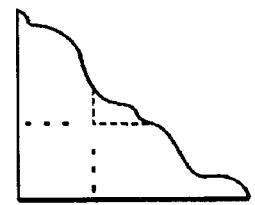

Referring to FIG. 8, with the input of either step 206 or 212, the media size is set at step 216. Subsequent to setting the media size, the process proceeds to application of the second routine in which the user/operator provides input, at step 218, regarding trim appearance. In one example, suitable graphic information, in bit map form, is stored in memory, which graphic information represents a trim mark design. It will be appreciated by those skilled in the art, however, that the graphic information could be stored in one of various forms, such as in the form of vector information. In one example, a plurality of trim mark sets are maintained in respective memory files for viewing by the user on the user interface display screen. Each set would include at least one pair of trim marks for application to one or more locations on the subject electronic page upon which the trim marks are to be applied. Four examples of trim mark styles are shown in FIGS. 12A–12D, respectively. While the trim marks of FIG. 12A are considered herein as "standard" trim marks to be created from rule marks, other trim marks could be used as standard trim marks without affecting the purpose(s) of the preferred embodiment.

Subsequent to performing appropriate action at step 220 or 222, the process proceeds to a third subroutine in which the image may be auto-centered in accordance with a preselection made by the user. By way of the third subroutine, the user is asked, by way of a suitable dialog (step 226), whether the image is to be auto-centered. Assuming auto-centering is desired, as might be the case where the user desires trim bleed or precise registration of the image is not possible, the process proceeds to step 228 where a conventional auto-centering technique is used to center the image relative to the specified/selected media. To more fully appreciate the procedure underlying step 228, reference is made to FIGS. 10A–10D.

Figure 10A:
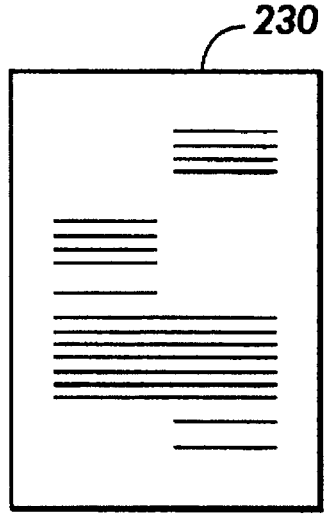
Figure 10B:
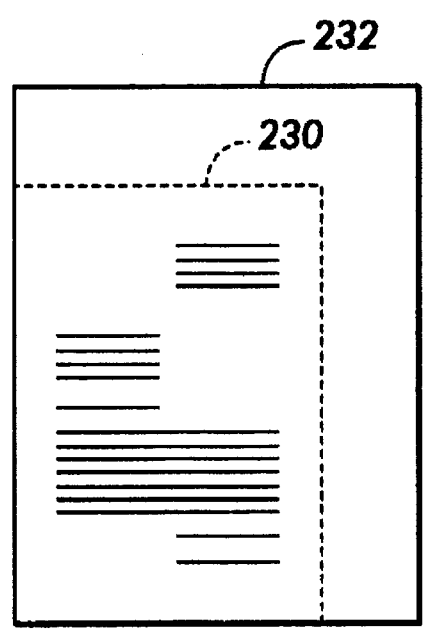
Figure 10C:
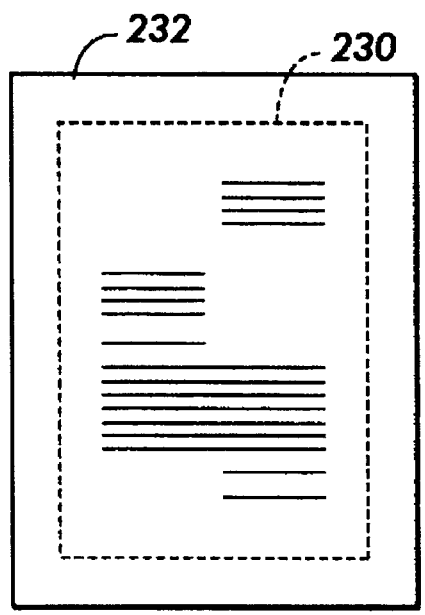
Figure 10D:
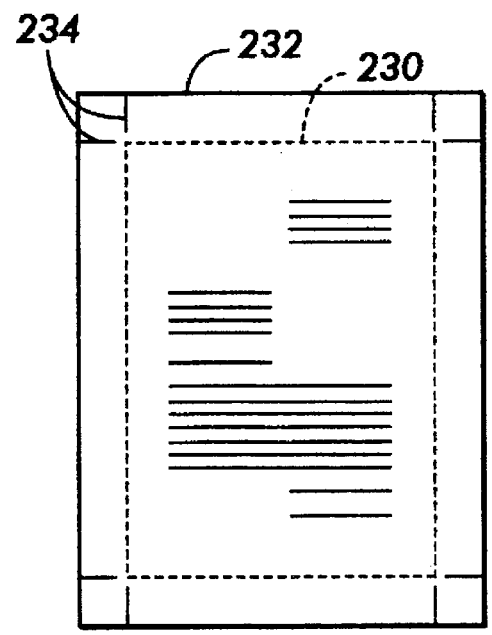

Referring to FIG. 10A, the image 230 to be superposed on the subject electronic page 232 (FIG. 10B) is provided. Initially, the image 230 is positioned relative to the subject electronic page in accordance with the illustrated embodiment of FIG. 10B and the image 230 is justified relative to a reference point, such as the lower left hand corner of the subject electronic page, In one example, the image manipulation of FIGS. 10B and 10C would be performed on a dialog of the type shown in FIG. 9. As should be appreciated, the dialog of FIG. 9 permits selection of an image from a job in memory 90 for merger on the subject electronic page.

To obtain auto-centering, the image is shifted in two directions, such as up and to the right. For those cases in which auto-centering is not available, the image could be positioned by shifting the image by distances equal to the minimum trim margin set in step 208 of FIG. 7. As shown in the illustrated embodiments of FIGS. 10C and 10D, the trim mark sets 234, each of which includes a pair of trim marks, are applied after shifting of the image; however, as indicated in step 236, preferably the trim marks would be applied to the subject electronic page prior to shifting the image 230. In the embodiment of FIGS. 10A–10D, it is easy to generate the trim marks by simply using an application that turns on selected pixels in predesignated corner sections of the subject electronic page. In one example, templates are maintained in memory for each trim mark design.

Accordingly, once the trim mark style has been set and it is known that auto-centering is to be employed, reference can be made to the appropriate stored template to turn on the preselected pixels in the subject electronic page corners.

Referring to FIG. 11, in another embodiment, the image 230 is not shifted relative to the subject electronic page 232. In this approach, the image is justified relative to the reference point (i.e. the lower left hand corner in FIG. 11) and a set of trim marks is applied (steps 240 and 242 of FIG. 8). For purposes of applying the trim marks, it is useful to know where the edges of the image and the subject electronic page exist. This knowledge is readily obtainable from a prescan of the image or data of a network job. With the edge information, the trim marks can be drawn in alignment with selected edges of the image as shown in FIG. 11. Generating the bitmap of FIG. 11, in view of information provided by the current technique, is conventional and can be achieved with one of a variety of applications suited for use with digital printing systems of the type disclosed above. A suitable application for generating the trim marks of FIG. 11 can be obtained by use of a 6085 workstation (from Xerox Corporation) used in conjunction with a DocuTech printing system ("DocuTech" is a trademark of Xerox Corporation).

It should be appreciated that the trim mark application approach described above could be modified readily to be used with "multiple-up" documents. In one example, the system would store a template suitable for use with various multiple-up patterns. In one example an 11×17 template with trim marks in corner sections and trim marks between the image receiving areas would be stored. By reference to the template, the trim lines could easily be drawn on the subject electronic page for each multiple-up print to be produced.

Numerous features of the above-disclosed embodiment will be appreciated by those skilled in the art: First, the trim marks are applied within a production environment, such as a printing system, so that those users most familiar with both the relationship of the trim marks to the document and their ultimate use are responsible for applying them. Those outside of the production environment, including the document author and document finisher, are not as well suited as those in the production environment to perform steps associated with trim mark application, such as selecting appropriately sized media. Second, the trim mark application process can be performed semi-automatically so that the trim marks can be applied to media with a relatively high degree of speed and accuracy. Third, the presently disclosed technique provides a user with the ability to customize trim marks in order to obtain a desired style. At least in some circumstances, such customization facilitates the trimming process. Fourth, for those circumstances where auto-centering is not critical and precise image-to-media registration is available, the amount of trimming can be minimized by applying only a single set of trim marks. Finally, the disclosed technique teaches an approach for applying trim marks to multiple up documents.

What is claimed is:

1. In a printing system with an input system and a print engine, a job being provided to the printing system by way of the input system, the job including an image with at least one image edge and an image outline, the image outline including a set of corners and having at least one peripheral edge substantially adjacent the at least one image edge, the image being represented by image data and the image outline corresponding with a first set of dimensions, the image data of the image being associated with an electronic page having both a second set of dimensions and peripheral edges, the image being printed on a substrate corresponding with the second set of dimensions, the first set of dimensions being smaller, in magnitude, than the second set of dimensions, a system for applying trim marks to the electronic page, comprising:

a) a control system for linking the input system with the print engine, said control system, i) superposing the image outline on the electronic page in such a manner that the at least one peripheral edge of the image outline is substantially justified relative to the at least one peripheral edge, ii) in a first mode, shifting the image so that the image is spaced from each one of the peripheral edges of the electronic page, iii) in the first mode, applying sets of trim marks to the electronic page, each set of trim marks being positioned adjacent a corner of the image outline and iv) in a second mode, applying just one set of trim marks to the electronic page, the just one set of trim marks being positioned adjacent just one of the corners of the image outline; and b) a memory for storing a print ready representation, the print ready representation including the image superposed with the electronic page and at least one of the sets of trim marks being applied to the electronic page.

2. The trim mark applying system of claim 1 further comprising a user interface for inputting a distance value to define a set of margins, the set of margins being disposed about the image outline.

3. The trim mark applying system of claim 1, further comprising a user interface for specifying the second set of dimensions in accordance with user input.

4. The trim mark applying system of claim 1, wherein said control system generates the set of margins by reference to a minimum magnitude inputted by a printing system user at a user interface.

5. The trim mark applying system of claim 4, wherein said control system includes an image processing system, having image centering capability, for automatically centering the image relative to the peripheral edges of the electronic page.

6. The trim mark applying system of claim 1, wherein the print engine is used to produce the print with the print ready representation such that the trim marks are visible on the print for enabling a finishing operation to be performed on the print by reference to the visible trim marks.

7. The trim mark applying system of claim 1, wherein the trim marks are applied so that each mark extends from a point adjacent the image to a point immediately adjacent one of the peripheral edges.

8. The trim mark applying system of claim 1, in which the trim marks are applied to the electronic page by reference to one of a plurality of trim mark designs stored in the memory, wherein the trim marks are applied in accordance with a trim mark design retrieved from said memory with said control system.

9. The trim mark applying system of claim 8, further comprising a user interface for permitting a printing system user to select which of the plurality of trim mark designs is to be retrieved from said memory with said control system.

* * * * *